(12) United States Patent
Choiniere

(10) Patent No.: US 10,274,745 B2
(45) Date of Patent: Apr. 30, 2019

(54) SYSTEM FOR UNIFORMLY ILLUMINATING TARGET TO REDUCE SPECKLING

(71) Applicant: BAE Systems Information and Electronics Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 455 days.

(21) Appl. No.: 15/029,298

(22) PCT Filed: Aug. 14, 2015

(86) PCT No.: PCT/US2015/045271
§ 371 (c)(1),
(2) Date: Apr. 14, 2016

(87) PCT Pub. No.: WO2016/025831
PCT Pub. Date: Feb. 18, 2016

(65) Prior Publication Data
US 2016/0259176 A1     Sep. 8, 2016

Related U.S. Application Data

(60) Provisional application No. 62/037,182, filed on Aug. 14, 2014.

(51) Int. Cl.
*G02B 6/04*     (2006.01)
*G02B 27/48*    (2006.01)
(Continued)

(52) U.S. Cl.
CPC ............... *G02B 27/48* (2013.01); *G02B 6/04* (2013.01); *G02B 26/08* (2013.01); *G03B 15/06* (2013.01)

(58) Field of Classification Search
CPC .......... G02B 27/48; G02B 6/04; G02B 26/08
See application file for complete search history.

(56) References Cited

U.S. PATENT DOCUMENTS 6,249,381 B1 * 6/2001 Suganuma ........... G02B 27/123
359/618
7,733,927 B2    6/2010 Furuya et al.
(Continued)

FOREIGN PATENT DOCUMENTS

WO      WO2013/171613 A1    11/2013
WO      WO2014/045564 A1    3/2014
WO      PCT/US2015/045271   8/2015

*Primary Examiner* — Evan P Dzierzynski
(74) *Attorney, Agent, or Firm* — Davis & Bujold, PLLC; Scott J. Asmus

(57) ABSTRACT

An illumination system for uniform illumination of a target to facilitate imaging of the target by an imaging system. The apparatus which comprises a laser source for generating a plurality of independent or quasi-independent point sources of light; a fiber optic bundle which comprises a plurality of individual optical fibers for each receiving at least one of the plurality of point sources of light, from the laser source, and directing the plurality of point sources of light toward the target for illumination thereof; and an oscillating diffuser for receiving the plurality of point sources of light and oscillating at a frequency so as to redirect each one of the plurality of point sources of light over an area of the target to be illuminated to facilitate uniform illumination and imaging thereof.

20 Claims, 7 Drawing Sheets

(51) Int. Cl.
 *G02B 26/08* (2006.01)
 *G03B 15/06* (2006.01)

(56) References Cited

U.S. PATENT DOCUMENTS

| | | |
|---|---|---|
| 8,469,519 B2 | 6/2013 | Marcus et al. |
| 8,517,542 B2 | 8/2013 | Endo et al. |
| 2003/0098349 A1 | 5/2003 | Tsikos et al. |
| 2006/0126184 A1 | 6/2006 | Kim et al. |
| 2010/0118535 A1* | 5/2010 | Kusukame ............ G02B 27/48 362/259 |
| 2010/0165301 A1* | 7/2010 | Kojima ................. G02B 27/48 353/38 |
| 2012/0140320 A1* | 6/2012 | Arntsen ............. G02B 27/2264 359/462 |
| 2012/0170110 A1* | 7/2012 | Lippey .................. G02B 27/48 359/327 |
| 2012/0300277 A1 | 11/2012 | Cobb et al. |
| 2012/0307349 A1 | 12/2012 | Arntsen et al. |
| 2014/0009808 A1 | 1/2014 | Wang et al. |
| 2014/0375963 A1* | 12/2014 | Bishop .................. G02B 27/48 353/38 |
| 2015/0286064 A1* | 10/2015 | Liu ....................... G02B 27/48 349/9 |

\* cited by examiner

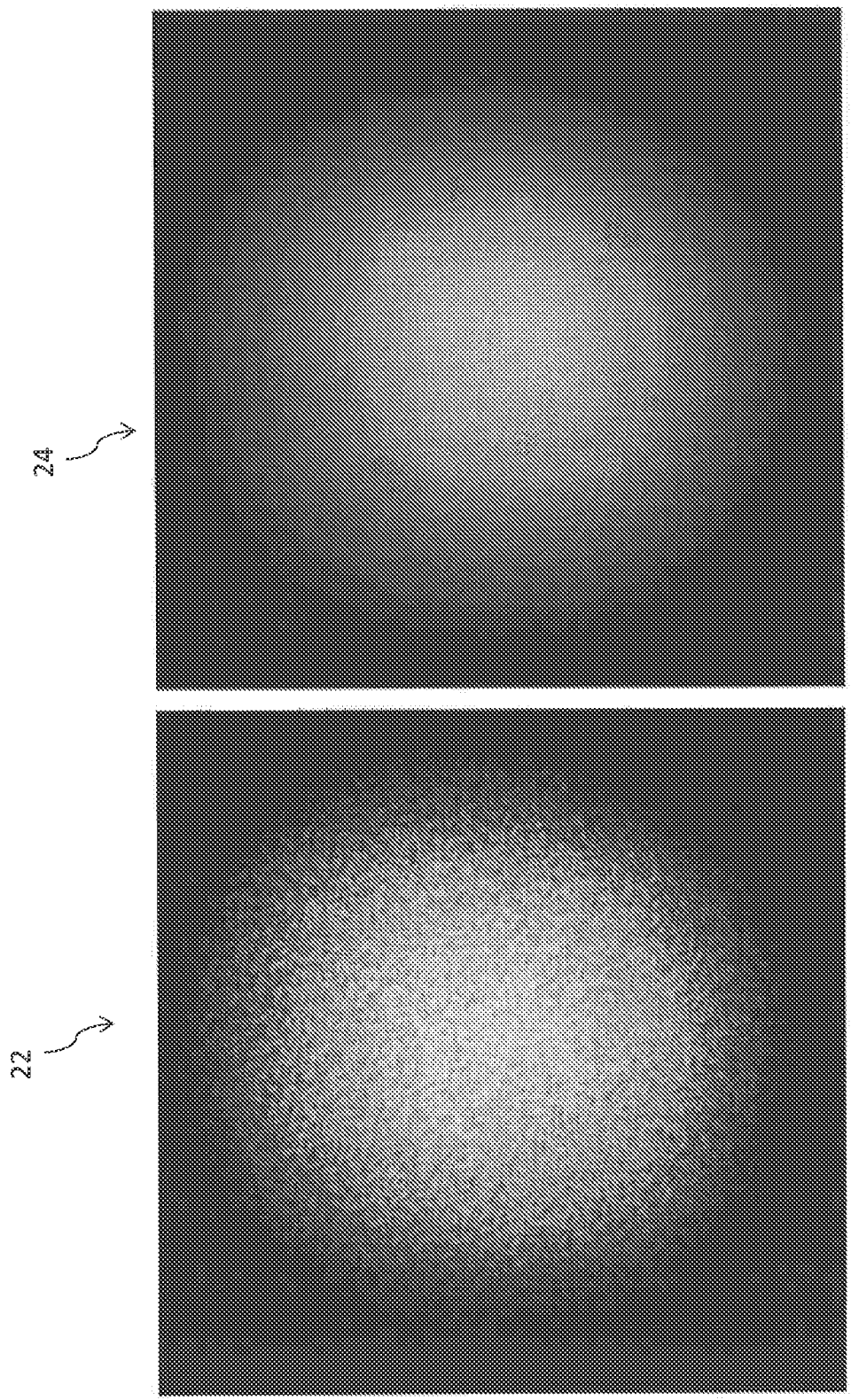

| Mechanical Specification | | LSR-5-17 | LSR-10-22 | |
|---|---|---|---|---|
| Clear | aperture | 5 | 10 | mm |
| External | dimensions | 17x17 | 22x22 | mm |
| Thickness | | 3.8 | 3.8 | mm |
| Weight | LSR only / including electronic | 1.44/2.50 | 2.18/3.24 | g |
| Electrical Specifications | | | | |
| Power | supply (micro-USB interface) | 5 | 5 | VDC |
| Power | consumption | 310 | 310 | mW |
| Optical Specifications | | | | |
| Diffusion | angle | (FWHM) | 1°/10°/20° | 1°/10°/20° |
| Damage | threshold | >1000 | >1000 | W/cm2 |
| Oscillation | frequency | ~300 | ~180 | Hz |
| Oscillation | amplitude | ~400 | ~400 | µm |
| Thermal Specifications | | | | |
| Storage | temperature | [-40,+85] | [-40,+85] | °C |
| Operating | temperature | [-30,+85] | [-30,+85] | °C |

FIG. 5

SYSTEM FOR UNIFORMLY ILLUMINATING TARGET TO REDUCE SPECKLING

FIELD OF THE INVENTION

The present invention relates to lasers and, more particularly, the invention relates to using at least one laser in order to uniformly illuminate a desired target and facilitate improved imaging of the target by a conventional imaging device or system.

BACKGROUND OF THE INVENTION

The prior art discloses a number of ways to achieve desired illumination of a target.

For example, U.S. Pat. No. 6,672,739 concerns a laser beam homogenizer. This apparatus was developed for the illumination of lithographic masks, or more specifically, an object in a microscope. The output of a laser beam homogenizer is imaged onto a field for wide field illumination. The image of the output is dithered with respect to the field. However, this apparatus requires that the illuminating ray bundle must be injected into the lens along a plane defined by one of the great arcs on the lens surface and the light polarization must be parallel- or perpendicular to that plane. Further limitations of this apparatus include image distortion due to residual non-uniform background illumination.

U.S. Pat. No. 4,011,403 involves fiber optic laser illuminators. This apparatus is an endoscopic or microscopic illumination and imaging system for a surgical area. It uses a laser beam as a light source, an optical fiber as a transmitter, and a sensing means to display an illuminated object. Speckle reduction is available with the use of a light-flow-disruptive means acting on a collimated line of illumination.

U.S. Pat. No. 8,372,004 pertains to speckle reduction of microwhite endoscopes. It consists of an actuator, a light source, a light-conducting element, and a fluorescence converter. This assembly generates perturbations or fluctuations to reduce speckles in an endoscopic image. However, transmission of motor vibrations onto the housing or other components of the proximal supply unit can cause unintended disturbances of the endoscopic system.

Notwithstanding the above known the prior art illumination arrangements and techniques, there still remains a need for improved uniform illumination of a desired target, by use of at least one laser, which facilitate improved imaging of the illuminated target by an imaging system.

SUMMARY OF THE INVENTION

Wherefore, it is an object of the present invention to overcome the above mentioned shortcomings and drawbacks associated with the prior art illumination apparatus, systems and techniques.

The present invention provides an apparatus which uniformly illuminates a desired target by use of at least one laser, such as a laser diode, to facilitate imaging of the target by a conventional imaging system, such as a camera. The invention utilizes many independent, or quasi-independent, point sources of light and also comprises at least one laser source, a multi-fiber or fiber optic bundle, and typically an oscillating diffuser which assists with scrambling the light prior to illumination of the target. The present invention also minimizes the associated cost of adequately illuminating the target while simultaneously greatly reducing the speckle effect of an image of the target.

Another object of the present invention is to adequately and uniformly illuminate a target which is located a distance away from the illumination system, for example, a long range target, e.g., a target located between 0.5 and 2 kilometers away from the illumination system, while still facilitating desired uniform illumination and imaging of such target by a conventional imaging system.

A further object of the present invention is to utilize an oscillating diffuser (e.g., oscillating diffuser subsystem unit), which is positioned along the travel path of the point sources of light (e.g., between the at least one laser and the output focusing lens) to defuse each of the emitted point sources of light from the laser or laser diode, prior to the point sources of light illuminating the target to the illuminated, in order to provide a first order of scrambling and homogenization of the light as the point sources of light pass through the oscillating diffuser and thereby uniformly illuminate the target to be illuminated so as to substantially reduce, or minimize to a great extent, the speckling effect which is contained in an image of the target and thereby improve surveillance and/or accurate determination of the target. It is to be appreciated that, according to the present invention, the oscillating diffuser subsystem unit may be positioned either before the fiber optic bundle or after the fiber optic bundle while still achieving the desired scrambling and homogenization of the light as the point sources of light pass therethrough.

Yet another object of the present invention is to recollimate or focus each one of the point sources of light via, a second focusing lens, after each one of the point sources of light exits from the outlet end of the fiber optic bundle, by spacing the second collimating lens at a desired distance, e.g., about 20 mm, from the outlet end of the fiber optic bundle. Such arrangement facilitates changing the divergence angle of the point sources of light from about 20° to about 3° after the point sources of light exit from the outlet end of the fiber optic bundle.

A still further object of the present invention is to combine between 50 to 250 separate optical fibers or so with one another, preferably combine between 100 to 200 separate optical fibers into a fiber optic bundle, in order to facilitate uniform illumination of the target to be illuminated by the light passing through the fiber optic bundle.

Yet another object of the present invention is to provide at least one twist, bend, curve or other alteration along an axial length of the fiber optic bundle in order to induce bouncing or reflection of the point sources of light, off the side walls of the optical fibers, and such bouncing of the light thereby assists with a second order of scrambling and homogenization of the light as the point sources of light travel along the length of the fiber optic.

The present invention also relates to an illumination system for uniform illumination of a target to facilitate imaging of the target by an imaging system, the apparatus comprising: a laser source for generating a plurality of independent or quasi-independent point sources of light; a fiber optic bundle comprising a plurality of individual optical fibers for each receiving at least one of the plurality of point sources of light, from the laser source, and directing the plurality of point sources of light toward the target for illumination thereof; and an oscillating diffuser for receiving the plurality of point sources of light and the oscillating diffuser oscillating at a frequency so as to redirect each one of the plurality of point sources of light over an area of the target to be illuminated to facilitate uniform illumination and imaging thereof.

The present invention further relates to a method of uniform illumination of a target, by an illumination system, to facilitate imaging of the target by an imaging system, the apparatus comprising: generating a plurality of independent or quasi-independent point sources of light via a laser source; forming a fiber optic bundle comprising a plurality of individual optical fibers for each receiving at least one of the plurality of point sources of light, from the laser source, and directing the plurality of point sources of light toward the target for illumination thereof; and receiving the plurality of point sources of light, via an oscillating diffuser, and oscillating the oscillating diffuser at a frequency so as to redirect each one of the plurality of point sources of light over an area of the target to be illuminated to facilitate uniform illumination and imaging thereof.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 2A is a diagrammatic view showing an image obtained by typical illumination according to the prior art which has a noticeable speckle effect, while FIG. 2B is a diagrammatic view showing the improved performance and the reduced speckle effect in the image obtained by the system according to the present invention;

FIG. 5 is a table of performance parameters for the oscillating diffuser subsystem unit for use with the present invention;

Figures 1, 1A:
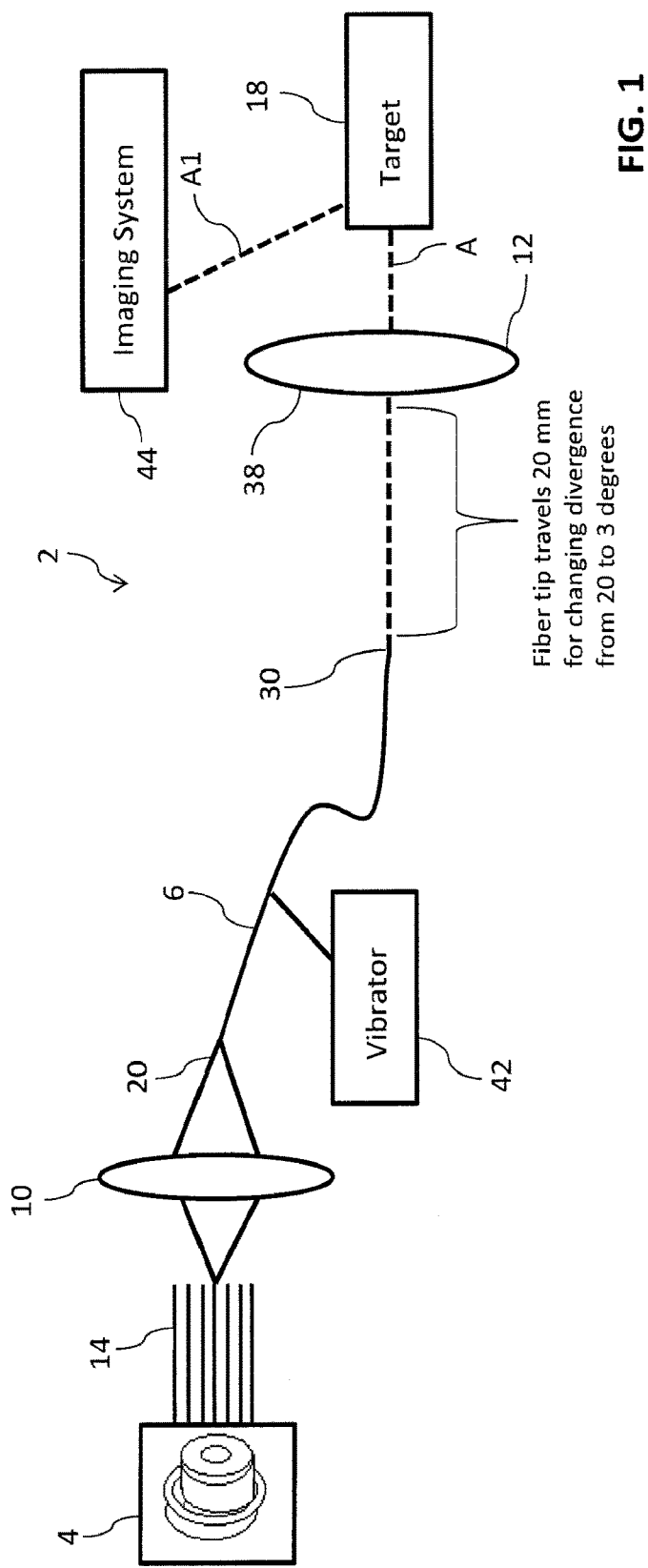
FIG. 1 is a diagrammatic view showing a first embodiment having a plain laser diode coupled with a fiber bundle for focusing the supplied illumination on the target and controlling speckle contained in the image of the illuminated target.
FIG. 1A is a partial diagrammatic view showing the plurality of optical fibers forming the fiber optic bundle of FIG. 1.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

As briefly noted above, prior attempts at reducing speckle were costly and did not adequately achieve an speckle reduction. Previously, a diverter would be used to randomize the light and such arrangement typically required optical fiber length between 10-20 meters in order to reduce speckle contained in the image of the illuminated target. The present invention allows for a much shorter distance of optical fiber cable in order to sufficiently reduce the speckle effect contained within an image of the illuminated target. As described more fully herein and the accompanying figures and the following description, the present invention provides an assembly or illumination system for uniform illumination of a target using lasers which greatly reduces, in a cost effectively manner, the speckle effect in the obtained image(s).

As described below in further detail, the apparatus or illumination system 2 the present invention generally comprises three main components: a laser source 4, a multi-fiber or optical fiber bundle 6, and an oscillating diffuser 8 (shown in FIGS. 3, 4, 6 and 7). In addition, the illumination system 2 also typically includes a first (focusing) lens 10 and a second (focusing) lens 12.

The first main component is the laser source or laser diode 4 which typically comprises many independent or quasi-independent point sources of light 14, e.g., typically between 1 and 15 or so individual sources of light as generally shown in FIG. 1. This laser source simulates the performance of a Vertical-Cavity Surface-Emitting Laser (VCSEL) array, an expensive and yet undeveloped technology. According to this first embodiment, this laser source 4 simulates several quasi-independent coherent sources 14 which are all generated from a single laser source and emitted toward the first lens 10, such as a focusing lens.

The second main component is the multi-fiber bundle or a fiber optic bundle 6 which typically comprises a plurality of separate individual optical fibers 16 which are closely clumped or packaged together, parallel to one another, as the fiber optic bundle 6, as diagrammatically shown in FIG. 1A. The fiber optic bundle 6 typically comprises between about 50 to 250 separate optical fibers 16, preferably between about 100 to 200 separate optical fibers 16. Each one of the optical fibers 16, forming part of the fiber optic bundle 6, has a length of between 3 inches and 5 inches, for example. It is to be appreciated that the length of the optical fibers 16 can vary, from application to application, without departing from the spirit and scope of the present invention. However, shorter length optical fibers 16 are preferred as this typically results in a smaller package for the illumination system 2. It is to appreciated that the travel path of the light will vary and is dependent upon the relative positions of the laser source 4 and the first lens 10 as well as the relative positions of the first lens 10 and the fiber optic bundle 6. Such relative spacing also helps to eliminate the issue of coherency upon integration.

The third main component is an oscillating diffuser 8, which is not utilized in the first embodiment shown in FIG. 1. The oscillating diffuser, utilized in this embodiment, is a part of an oscillating diffuser subsystem unit 8 which is designed to randomize the launch angle of the laser beams as they exit from the diffuser, travel toward and into the optical fibers, and fill the mode volume of the fiber. A suitable oscillating diffuser subsystem unit 8 oscillates, relative to or sweeps over the laser beam(s), at a frequency of 300 Hz and has a stroke of 400 μm. The diffuser has a clear aperture of 5-10 mm and typically uses 0.30 watts of power.

An additional benefit of this randomization is that it helps eliminate the issue of coherency upon integration by effectively changing the launch angle of the laser beams dynamically as they pass through the diffuser. This component also modulates the energy into each of the fibers proving random amplitude response with the preferred rate of 10 cycles per 1 camera frame integration of 0.03 seconds.

Now that the basic components of the present invention were briefly described, a detail description concerning various embodiments and arrangements of the invention will now be provided with reference to the accompanying drawings.

Turning first to FIG. 1, this Figure is a diagrammatic view showing a plain laser diode coupled with a fiber optic bundle 6 for focusing the illumination on the desired target 18 to be illuminated and controlling the "speckle" of the illuminated target 18. As shown in FIG. 1, the light is emitted from a single laser source 4, e.g., a laser diode in this embodiment. Following discharge of the laser beams 14 from the single laser source 4, the emitted light then diverges and travels or passes through a single first lens 10, e.g., a focusing lens, which is spaced from the single laser source 4 by a distance of between 2 mm to about 30 mm or so, e.g., more preferably about 20 mm, and arranged so as to converge essentially all of the point sources of light which passes through the first lens 10, at a first inlet surface 20 of at least one of the optical fibers 16 forming the fiber optic bundle 6.

As noted above, the fiber optic bundle 6 contains a plurality of separate optical fibers 16 which are prepackaged together and arranged parallel to one another to form the fiber optic bundle 6. The tip or inlet surface of each fiber extends so as to change or alter the divergence from 20° to 3° and reach its destination to display the image; the length of this extension is typically between 5 and 25 mm depending on the width of the desired beam. In FIG. 1, the shown length is 20 mm. It is to be appreciated that other lengths, such as between 3 mm and 100 mm may be suitable, depending upon the particular application, without departing from the spirit and scope of the present invention.

A conventional imaging system 44, such as a camera, is utilized to capture an image of the target 18 to be illuminated. A viewing axis A1 of the imaging system 44 is located offset but generally parallel to the illumination axis A of the apparatus or illumination system 2.

The improved images achieved by the illumination system 2, according to the present invention, can be readily seen with reference to FIGS. 2A and 2B. For example, the image 22 on the left in FIG. 2A is the result of illumination according to the prior art, while the image 24 on the right in FIG. 2B shows the improved results by using the present invention. As is readily visible from a comparison of FIGS. 2A and 2B, the image 24 on the right in FIG. 2B has a noticeable speckle reduction.

Figure 3:
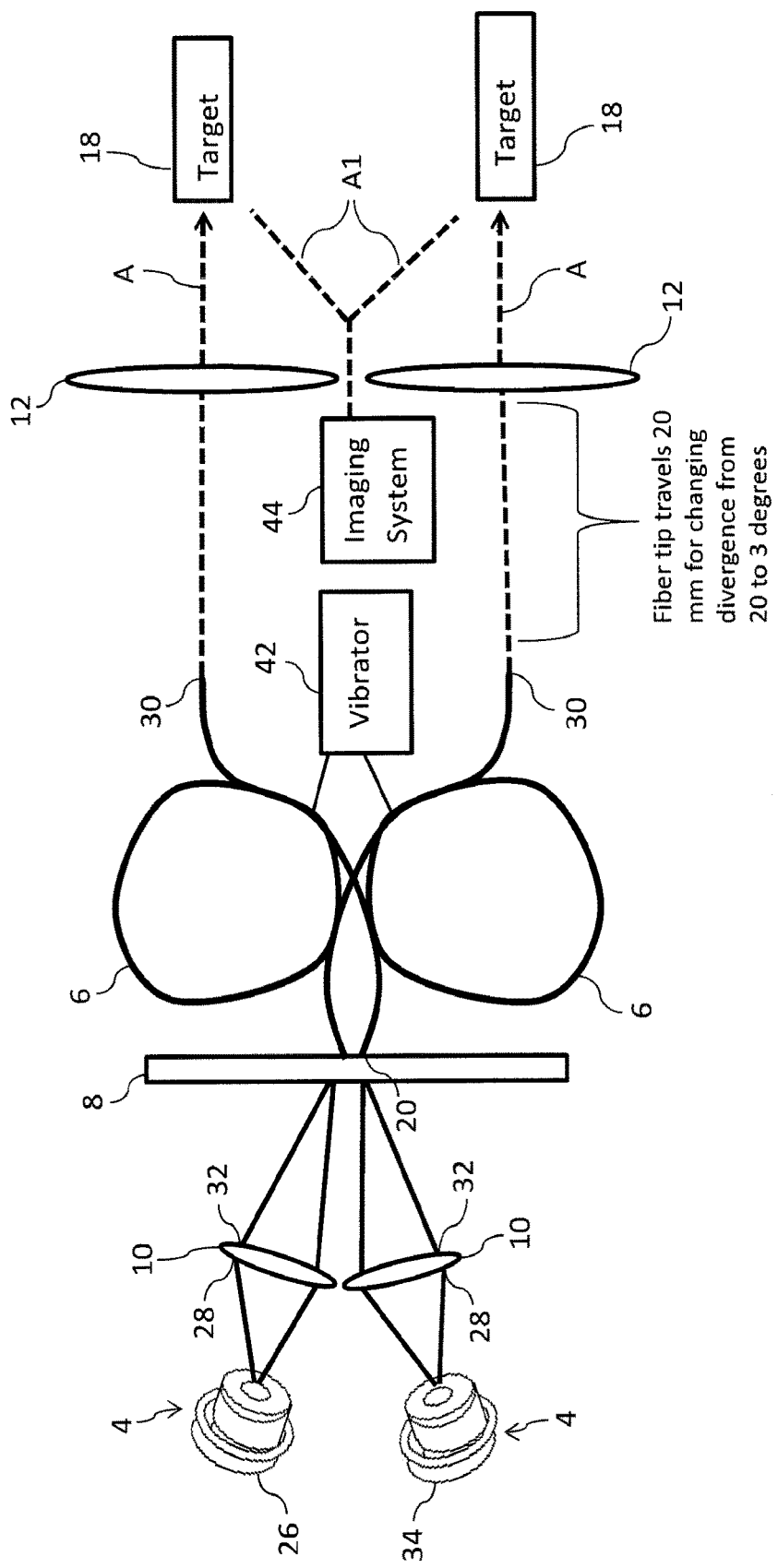
FIG. 3 is a diagrammatic view showing use of a second arrangement of the system according to the present invention which includes an oscillating diffuser.

FIG. 3 is a schematic drawing show an alternative arrangement for implementation of the present invention which, according to this embodiment, includes an oscillating diffuser subsystem unit 8. As shown in this Figure, a first laser beam 14 is emitted from a first laser source 4 which is supported by a first support 26. The first emitted laser beam 14 is directed from the first laser source 4 toward a first surface 28 of the first (focusing) lens 10. The first laser beam 14 enters and passes through the first surface 28 of the first lens 10 and exits from the second rear surface 32 of the first lens 10 and is thereafter directed, as a result of being focused by the first lens 10, toward inlet surface(s) 20 of one or more of plurality of optical fibers 16 which form the first fiber optic bundle 6.

As generally shown in this Figure, the first laser beam 14, after passing through the first lens 10, travels through the a oscillating diffuser subsystem unit 8, before eventually impinging on the inlet surfaces 20 of the optical fibers 16 which form the first fiber optic bundle 6. Typically, the oscillating diffuser subsystem unit 8 is located closely adjacent the inlet surfaces 20 of the optical fibers 16, e.g., only a few millimeters or so. As shown in this Figure, the first fiber optic bundle 6 is configured, bent, wrapped or "looped" by an angle greater than 360 degrees, e.g., wrapped around in a circle having a radius of between 0.5 inches and a couple of inches, for example. An outlet end 30 of the first fiber optic bundle 6 is spaced from, but aligned with, the second (focusing) lens 12. This second (focusing) lens 12 is arranged to collimate and focus the point sources of light from the first fiber optic bundle 6 and direct such light toward a first desired target 18 to be illuminated.

As shown in this Figure, each optical fiber 16 of the first fiber optic bundle 6 typically terminates or ends a short distance before the second lens 12. That is, the outlet surfaces 30 of the first plurality of optical fibers 16, forming the first fiber optic bundle 6, typically terminate approximately 20 mm before the second lens 12. It is to be appreciated that the outlet surfaces 12 of the first plurality of optical fibers 16, forming the first fiber optic bundle 6, may terminate between 5 mm and 100 mm, for example, before the second lens 10, without departing from the spirit and scope of the present invention. In addition, the spacing between the outlet surfaces 30 of the first plurality of optical fibers 16, forming the first fiber optic bundle 6, and the second lens 12 may be variable or adjustable, if so desired, to further enhance the uniform illumination of the target to be illuminated.

As also shown in this Figure, a second laser beam 14 is emitted from a second laser source 4 which is supported by a second support 34. The second emitted laser beam 14 is directed from the second laser source 4 toward a first surface 28 of the first l (focusing) lens 10. The second laser beam 14 enters and passes through the first surface 28 of the first lens 10 and exits from the second rear surface 32 of the first lens 10 and is thereafter directed, as a result of being focused by the first lens 10, toward inlet entrance surface(s) 20 of one or more of a first plurality of optical fibers 16 which form a second fiber optic bundle 6.

As generally shown in this Figure, the second laser beam 14, after passing through the first lens 10, travels through the oscillating diffuser subsystem unit 8 and eventually impinges on the inlet surfaces 20 of the optical fibers 16 which form the second fiber optic bundle 6. The second fiber optic bundle 6 is configured, bent, wrapped or "looped" by an angle greater than 360 degrees, e.g., wrapped around in a circle having a radius of between 0.5 inches and a couple of inches, for example. An outlet end 30 of the second fiber optic bundle 6 is spaced from, but aligned with, the second (focusing) lens 12. This second (focusing) lens 12 is arranged to collimate and focus the point sources of light from the second fiber optic bundle 6 and direct such light toward a second desired target 18 to be illuminated.

As shown in this Figure, each optical fiber 16 of the second fiber optic bundle 6 typically terminates or ends a short distance before the second lens 12. That is, the outlet surfaces 30 of the plurality of optical fibers 16 forming the second fiber optic bundle 6, typically terminate approximately 20 mm before the second lens 12. It is to appreciated that the outlet surfaces 30 of the plurality of optical fibers 16, forming the second fiber optic bundle 6, may terminate between 5 mm and 100 mm, for example, before the second lens 12, without departing from the spirit and scope of the present invention. In addition, the spacing between the outlet surfaces 30 of the second plurality of optical fibers 16, forming the first second optic bundle 6, and the second lens 12 may be variable or adjustable, if so desired to further enhance the uniform illumination of the target to be illuminated.

It is to be appreciated that the oscillating diffuser subsystem unit 8 reimages the first and the second laser beams and is capable of combining up to four wavelengths or working on a single wavelength. In addition, the diffuser may be custom-tuned to each wavelength of light used, depending upon the particular application, without departing from the spirit and scope of the present invention. The lens would be space restrictive but for the remoting option.

Figure 4:
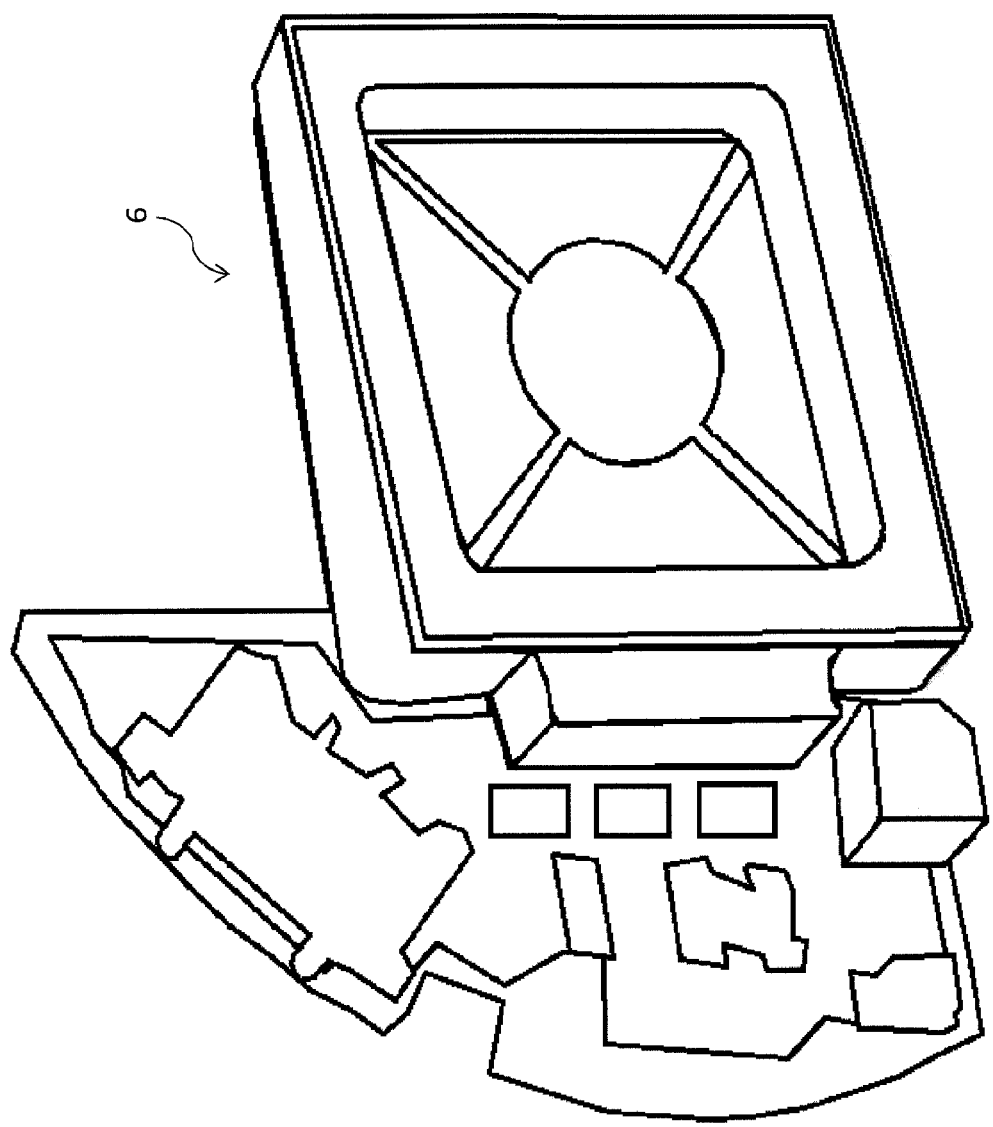
FIG. 4 is a diagrammatic perspective view of a currently available oscillating diffuser subsystem unit which assists with scrambling and homogenization of the point sources of light as such light passes through the oscillating diffuser subsystem unit.

With reference now to FIG. 4, a brief description concerning a currently available oscillating diffuser subsystem unit 8 will be now provided. One currently available diffuser subsystem unit, for example, is LSR-10-22 (or possibly LSR-5-17), both of which are manufactured by Optotune Switzerland AG of Dietikon, Switzerland. As generally shown in this figure, the diffuser subsystem unit 8 is an oscillating diffuser which optimizes the use of the fibers 16 by randomizing the launch angle of the light beams or the point sources of light as such point sources of light pass through the diffuser and are directed toward an inlet surface 20 of one of more of the optical fibers 16 forming the fiber optic bundle 6. Due to the variation/randomization of the launch angle of light sources, each light source is redirected, by the diffuser so as to illuminate slightly different area of the target 18 to be illuminated. The different launch angles achieved by the diffuser assists with uniform illumination of the target 18 to be illuminated.

As noted above, the fiber optic bundle 6 is useful in filling the mode volume of the fiber over time. This subsystem unit 8 also modulates the energy into each of the optical fibers 16 and thereby assisting with providing random amplitude response. In the embodiment shown in FIG. 1, a rubber of the diffuser vibrates at 300 Hz which assists with scattering the point sources of light and thereby improving uniform illumination of the target 18 which, in turn, results in unexpected clarification in an imaging of the target 18 to be illuminated.

The performance parameters, for a suitable diffuser assembly unit 8 for use with the present invention, are set forth in the Table shown in FIG. 5. It is to be appreciated that these parameters are only examples of suitable parameters for the practice of the present invention. That is, such parameters can vary, from application to application, without departing from the spirit and scope of the present invention.

Figure 6:
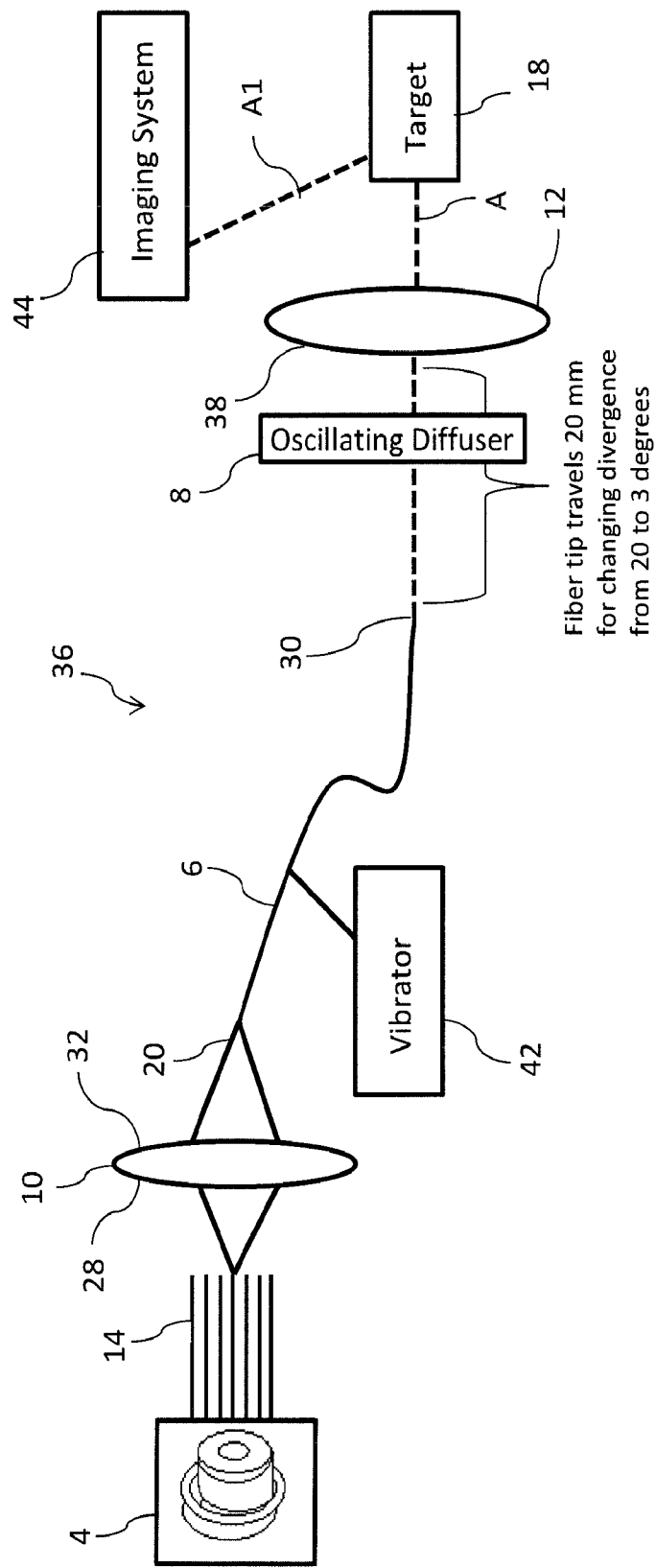
FIG. 6 is a diagrammatic view showing a further possible arrangement of the system according to the present invention.

Turning now to FIG. 6, a further embodiment of the present invention will now be described. As this embodiment is very similar to the previously discussed embodiments, only the differences between this new embodiment and the previous embodiment will be discussed in detail while identical elements will be given identical reference numerals. In view of such similarity, much of the above disclosure is also directly applicable to this embodiment and thus not repeated.

According to this embodiment, the light 14 emitted by the single laser source 4, e.g., a laser diode, travels or passes through a first lens 10, e.g., a focusing lens, which is spaced from the single laser source 4 by a distance of 2 to 30 mm or so. The focusing lens 10 is arranged so as to converge or focus essentially all of the light, which passes through the first lens 10, at an inlet surface 20 of at least one of the optical fibers 16 forming the fiber optic bundle 6. As with the previous embodiments, the fiber optic bundle 6 contains a plurality of separate optical fibers 16 which are prepackaged together parallel to one another to form the fiber optic bundle 6. As generally shown in this figure, the fiber optic bundle 6 may have only one or may have more than one minor bend(s), turn(s), undulation(s) and/or curve(s) 36 formed therein. Such bends, turns, undulations and/or curves 36, formed in the fiber optic bundle 6, are designed to assist with bouncing or reflecting the point sources of light, traveling along the individual optical fibers 16, off an inwardly facing side surface of the individual optical fibers 16. This bouncing or reflecting wed thereby further assists with homogenization of the point sources of light passing therethrough.

The point sources of light eventually exit from the outlet ends 30 of the fiber optic bundle 6 and are directed toward a first surface 38 of the second (focusing or reimaging) lens 12. However, according to this embodiment, the oscillating diffuser subsystem unit 8 is located between the outlet ends 30 of the fiber optic bundle 6 and the first surface 38 of the second lens 12. As a result of such arrangement, the point sources of light must first pass through the oscillating diffuser subsystem unit 8 before eventually being collimated by the second lens 12 of the system. The oscillating diffuser subsystem unit 8 is designed to change the launch angle and thereby "scatter," "smear" or "spread" the light, as such point sources of light pass through and are altered by the oscillating diffuser subsystem unit 8, over a larger area or region of the first surface 38 of the second lens 12—instead of at a single point—which assist with homogenization of the light source, collimated by the second lens 12, and uniform illumination of the target 18 to be illuminated. Preferably, the outlet ends 30 of the fiber optic bundle 6 are spaced from an inlet surface of the diffuser by a distance of between a few millimeters to 20 mm, while an outlet surface of the diffuser is spaced from the first surface 38 of the second lens 12 by a distance of between a few millimeters and 20 mm.

Figure 7:
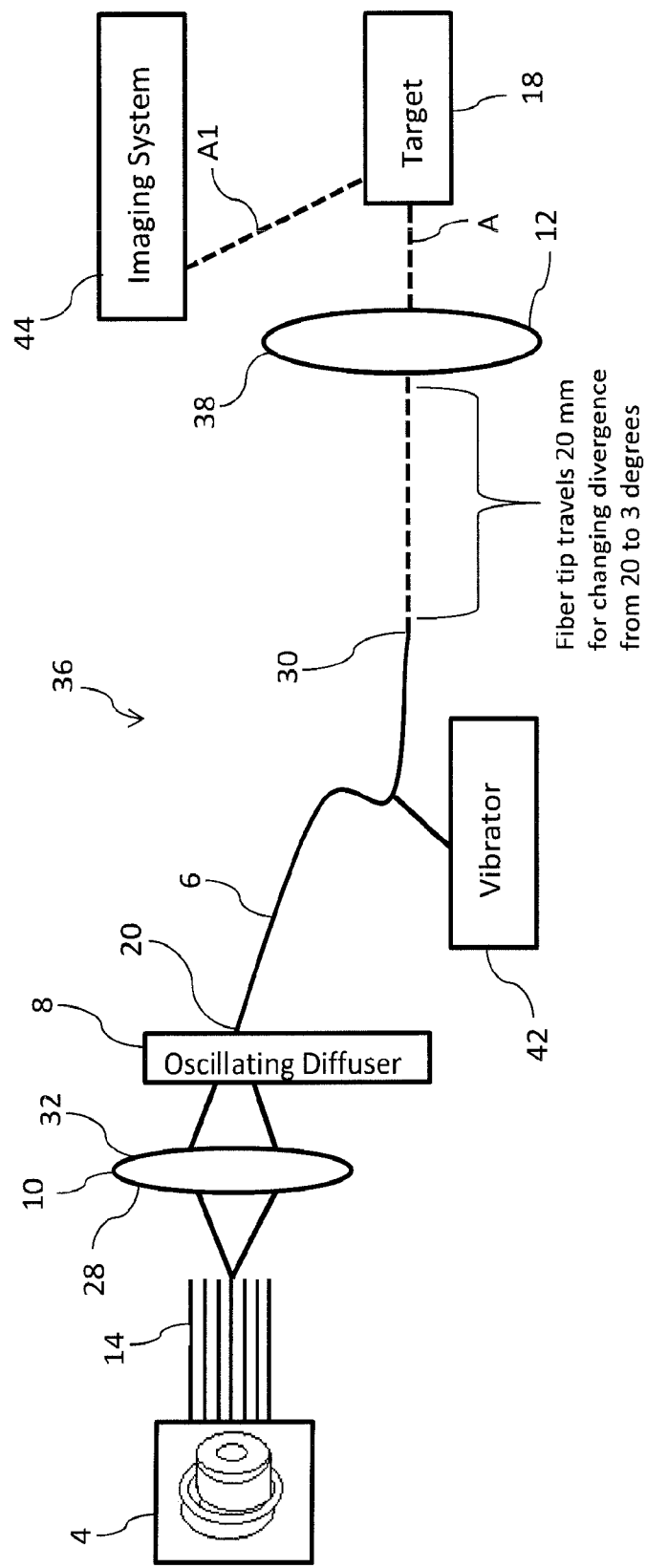
FIG. 7 is a diagrammatic view showing a still further possible arrangement of the system according to the present invention.

Turning now to FIG. 7, a still further embodiment of the present invention will now be described. As this embodiment is very similar to the previously discussed embodiments, only the differences between this new embodiment and the previous embodiment will be discussed in detail while identical elements will be given identical reference numerals. In view of such similarity, much of the above disclosure is also directly applicable to this embodiment and thus not repeated.

According to this embodiment, the light emitted by the single laser source 4, e.g., a laser diode, travels or passes through the first lens 10, e.g., a focusing lens, which is spaced from the single laser source 4 by a distance of 2 to 30 mm or so, and arranged so as to converge, essentially all of the light which passes through the first lens 10, toward an inlet surface 20 of at least one of the optical fibers 16 forming the fiber optic bundle 6.

The oscillating diffuser subsystem unit 8 is located between the first lens 10 and the inlet surfaces 20 of the optical fibers 16 forming the fiber optic bundle 6. As with the previous embodiments, the oscillating diffuser subsystem unit 8 is designed to change the launch angle and thereby "scatter," "smear" or "spread" the light, as such point sources of light pass through and are altered by the oscillating diffuser subsystem unit 8, over an area or region of the inlet surfaces 20 of the optical fibers 16—instead of at a single point—which assists with homogenization of the light source and uniform illumination of the target 18 to be illuminated. Preferably, the inlet ends 20 of the fiber optic bundle 6 are spaced from an outlet surface of the diffuser by a distance of between a few millimeters and 20 mm, while an inlet surface of the diffuser is spaced from the first surface 28 of the first lens 10 by a distance of between a few millimeters and 20 mm.

As with the previous embodiments, the fiber optic bundle 6 contains a plurality of separate optical fibers 16 which are prepackaged together and arranged parallel to one another to form the bundle 6. As generally shown in this figure, the fiber optic bundle 6 may have only one or more minor bend(s), turn(s), undulation(s) and/or curve(s) 36 formed therein. Such bends, turns, undulations and/or curves 36, formed in the fiber-optic bundle 6, assist with bouncing the point sources of light, traveling along the individual optical fiber 16, off an inwardly facing side surface of the individual optical fibers 16 and thereby further assist with homogenization of the point sources of light passing therethrough.

The point sources of light eventually exit from the outlet ends 30 of the fiber optic bundle 6 and are directed toward the first surface 38 of the second lens 12. The second (focusing or reimaging) lens 12 focuses and collimates the light and directs the light toward the target 18 to be illuminated.

If desired, the fiber optic bundle 6 can be coupled to a vibrator 42 (only diagrammatically shown) which induces vibration into the fiber optic bundle 6 while the fiber optic bundle 6 is illuminating the target 18 to be illuminated. That is, the vibrator vibrates either all, or at least a portion of, the fiber optic bundle 6 at a desired frequency, e.g., at 15 Hz, and such vibration of the fiber optic bundle 6 induces the point sources of light, as such light travels along the individual optical fibers 16, to repeatedly bounce or reflect off the inwardly facing surfaces of the optical fibers 16. Such additional bouncing or reflection of the point sources of light off the inwardly facing surfaces of the optical fibers 16 assist with homogenizing the point sources of light and thereby provides a more uniform illumination of the target 18 to be illuminated.

The imaging device 44 has a shutter speed, which is normally adjustable. Typically, the rate of varying the launch angles of the diffuser is faster, e.g., about 10 time faster, than the shutter speed of the imaging device 44. Due to the rapid response of the oscillating diffuser subsystem unit 8, relative to a shutter speed of the imaging system 44, the diffuser of the oscillating diffuser subsystem unit 8 is able to spread or distribute the light passing therethrough over a wider area of the target 18 to be illuminated, instead of at a point, while the imaging system is collecting an image of the target. This distribution of light facilitates the gathered image of the target, obtained by the imaging system, with an average illumination of the target, which minimizes speckling in the image of the target. That is, while a lens of the imaging device 19 is "open" and gathering light for creating an image of the target 18, each individual source of light is "scattered," "smeared" or "spread," while passing through the oscillating diffuser subsystem unit 8, over a larger area of the first surface 38 of the second lens 12—instead of being directed at a single point—and this scattering assists with homogenization of the light source as such individual sources of light travel through a remainder of the illumination system 2 and thereby provide a more uniform illumination of the target 18 to be illuminated. The unanticipated synergistic effect of the relationship of the shutter speed of the imaging device 19 to the oscillating diffuser subsystem unit 8 provides an image obtained by the imaging device 19 which contains far less speckling than the methods and devices in the prior art.

The diffuser modulates the energy into each of the optical fibers 16 providing random amplitude response, typically 10 cycles per 1 camera frame integration of 0.03 seconds. The path length down each of the optical fibers is different due to the relative position of the first lens 10 and the optical fibers 16. By effectively changing the launch angle of the oscillating diffuser 8 dynamically, the actual path length is different for each optical fiber 16 thereby eliminating the coherency issue as the sources are integrated. Thus, the method, according to the present invention, approximates a VSCELs output without the expense or NRE development.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

Wherefore, I claim:

1. An illumination system for uniform illumination of a target to facilitate imaging of the target by an imaging system, the apparatus comprising:
    a laser source for generating divergent light;
    a first lens, located between the laser source and a first end of a fiber optic bundle, the first lens receives the divergent light and focuses it to converge upon entry into the first end of the fiber optic bundle;
    the fiber optic bundle directing the light toward the target for illumination thereof;
    a second lens, located between a second end of the fiber optic bundle and the target to be illuminated, receives the light exiting the fiber optic bundle and focuses and directs the light toward the target to be illuminated;
    an oscillating diffuser located between the first lens and the second lens for oscillating at a frequency so as to randomize and homogenize the light as the light passes through the oscillating diffuser to substantially eliminate the issue of coherency upon integration by an imaging system, and the imaging system having an integration time that is slower than the frequency of oscillation of the oscillating diffuser, such that the oscillating diffuser is able to spread the light passing therethrough over a wider area of the target to be illuminated while the imaging system is collecting an image of the target, so that a gathered image of the target, obtained by the imaging system, is an average illumination of the target which substantially minimizes speckling in the image of the target.

2. The illumination system for uniform illumination of the target according to claim 1, wherein the fiber optic bundle has at least one bend along a length thereof which assists with one of bouncing and reflecting the light off a side wall of the optical fibers to assist with homogenizing light and thereby providing a uniform illumination of the target to be illuminated.

3. The illumination system for uniform illumination of the target according to claim 1, wherein the oscillating diffuser is located between the first lens and the first end of the fiber optic bundle, and the oscillating diffuser receives the focused light and transmits that light over an area of the inlet surfaces of the individual optical fibers forming the first end of the fiber optic bundle to facilitate uniform illumination of the target to be illuminated.

4. The illumination system for uniform illumination of the target according to claim 1, wherein the oscillating diffuser is located between the second end of the fiber optic bundle and the second lens, and the oscillating diffuser receives the light from the second end of the fiber optic bundle and focuses the light over an area of the second lens to facilitate uniform illumination and the target to be illuminated.

5. The illumination system for uniform illumination of the target according to claim 1, wherein the laser source is a laser diode which generates between 1 and 15 individual sources of light for illuminating the target to be illuminated.

6. The illumination system for uniform illumination of the target according to claim 1, wherein the first lens is spaced from the laser source by a distance of between 2 to about 30 mm and arranged so as to converge essentially all of light, which passes through the first lens, at an inlet surface of at least one of the optical fibers forming the fiber optic bundle.

7. The illumination system for uniform illumination of the target according to claim 1, wherein outlet surfaces of the plurality of optical fibers at the second end of the fiber optic bundle are spaced approximately 20 mm from the second lens.

8. The illumination system for uniform illumination of the target according to claim 1, wherein the oscillating diffuser oscillates at a frequency of 300 Hz and has a stroke of 400 µm.

9. The illumination system for uniform illumination of the target according to claim 1, wherein the fiber optic bundle has an axial length of between 1 inch and 40 inches and the fiber optic bundle includes between 50 to 250 separate optical fibers.

10. The illumination system for uniform illumination of the target according to claim 9, wherein the fiber optic bundle has an axial length of between 3 inches and 5 inches and the fiber optic bundle includes between 100 to 200 separate optical fibers.

11. The illumination system for uniform illumination of the target according to claim 1, wherein a vibrator is coupled to the fiber optic bundle to induce vibration into the fiber optic bundle while the fiber optic bundle is illuminating the target to be illuminated.

12. The illumination system for uniform illumination of the target according to claim 11, wherein the vibrator vibrates at least a portion of the fiber optic bundle at a frequency of 15 Hz.

13. The illumination system for uniform illumination of the target according to claim 1, wherein the oscillating diffuser randomizes a launch angle of the light, as such light passes through the diffuser and directs the light toward the optical fibers forming the fiber optic bundle, and such randomization of the launch angle of the light from the light source, illuminates a slightly different area of the target to be illuminated and thereby assists with uniform illumination of the target to be illuminated.

14. The illumination system for uniform illumination of a target according to claim 1, wherein a distance between the second end of the fiber optic bundle and the second lens is variable or adjustable.

15. An illumination system for uniform illumination of a target, said apparatus comprising:
a laser source for emitting light;
a multi-fiber bundle, the fiber optic bundle having at least one bend along a length thereof which assists with one of bouncing and reflecting the light off a side wall of the optical fibers to assist with homogenizing the light and thereby providing uniform illumination of the target to be illuminated;
an oscillating diffuser located between a first lens and a second lens for oscillating at a frequency so as to randomize and homogenize the light as the light passes through the oscillating diffuser to substantially eliminate the issue of coherency upon integration by an imaging system;
the first lens located between the laser source and the fiber optic bundle; and
the second lens located between the fiber optic bundle and the target to be illuminated.

16. The illumination system for uniform illumination of a target according to claim 15, wherein a distance between the second end of the fiber optic bundle and the second lens is variable or adjustable.

17. The illumination system for uniform illumination of a target according to claim 15, wherein outlet surfaces of the plurality of optical fibers at the second end of the fiber optic bundle are spaced approximately 20 mm from the second lens.

18. A method of uniform illumination of a target, by an illumination system, to facilitate imaging of a target by an imaging system, the method comprising:
generating divergent light via a laser source;
forming a fiber optic bundle comprising a plurality of individual optical fibers for each receiving light from the laser source, and directing the light toward the target for illumination thereof;
receiving the light, via an oscillating diffuser; and
oscillating the oscillating diffuser at a frequency faster than an integration time of an imaging system so as to randomize and homogenize the light as the light passes through the oscillating diffuser to substantially eliminate the issue of coherency upon integration by an imaging system so that a gathered image of the target, obtained by the imaging system, is an average illumination of the target which substantially minimizes speckling in the image of the target.

19. The method of uniform illumination of a target according to claim 18, wherein outlet surfaces of the plurality of optical fibers at the second end of the fiber optic bundle are spaced approximately 20 mm from the second lens.

20. The method of uniform illumination of a target according to claim 18, wherein a distance between the second end of the fiber optic bundle and the second lens is variable or adjustable.

* * * * *